United States Patent
Takahashi et al.

[11] 3,798,526
[45] Mar. 19, 1974

[54] HIGH SPEED STEPPING MOTOR WITH MECHANICAL COMMUTATOR

[75] Inventors: Yukiharu Takahashi, Yokohama; Moritada Kubo, Tokyo, both of Japan

[73] Assignee: Tokyo Shibaura Electric Company, Ltd., Kanagawa-ken, Japan

[22] Filed: Dec. 30, 1971

[21] Appl. No.: 214,306

[30] Foreign Application Priority Data
Dec. 31, 1970 Japan.............................. 45/123622

[52] U.S. Cl...................... 318/696, 318/685, 310/49
[51] Int. Cl. ........................................... H02k 37/00
[58] Field of Search ........... 318/696, 685, 138, 439; 310/49

[56] References Cited
UNITED STATES PATENTS

| | | | |
|---|---|---|---|
| 1,914,481 | 6/1933 | Brown............................. | 318/696 X |
| 3,466,517 | 9/1969 | Leenhouts ......................... | 318/696 |
| 3,582,751 | 6/1971 | Rosshirt............................. | 318/696 |
| 1,071,920 | 9/1913 | Hill...................................... | 310/49 |
| 1,949,145 | 2/1934 | Luca................................. | 310/49 X |
| 1,874,094 | 8/1932 | Ford et al. ....................... | 318/696 X |
| 3,652,909 | 3/1972 | Rainer................................ | 318/254 |

*Primary Examiner*—G. R. Simmons
*Attorney, Agent, or Firm*—Oblon, Fisher, Spivak, McClelland & Maier

[57] ABSTRACT

A high speed stepping motor includes a stator having a bore and a plurality of salient poles on which stator windings are wound. A rotor is provided and has a plurality of axial teeth and slots alternatively positioned on a peripheral surface thereof. A plurality of rotor windings are respectively mounted in the slots of the rotor. A commutator is mounted on a shaft of the rotor and has segments which are respectively connected to the rotor windings. Brushes are provided for making contact with the commutator segments to enable electric energy to be supplied to the rotor windings. Means are provided for changing the direction of energization of the stator windings to thereby change the direction of the magnetic field resulting therefrom and for changing the direction of energization of the rotor windings in synchronization therewith.

6 Claims, 15 Drawing Figures

PATENTED MAR 19 1974 3,798,526

FIG. 5a
STABLE STATE
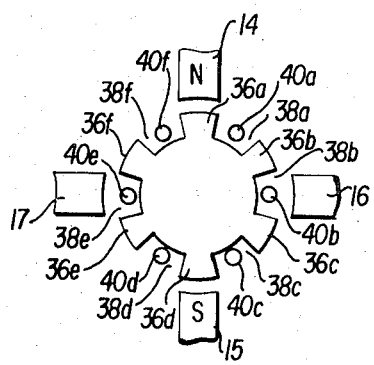
FIG. 5b
STARTING STATE
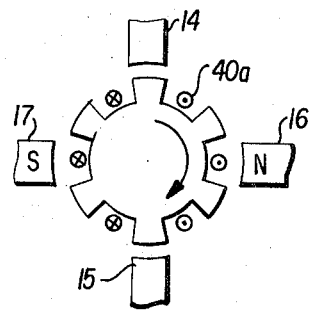
FIG. 5c
RUNNING STATE
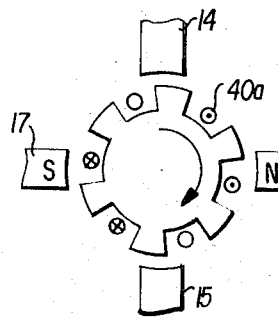
FIG. 5d
DAMPING STATE
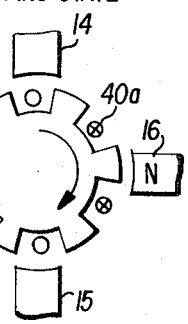
FIG. 5e
STABLE STATE
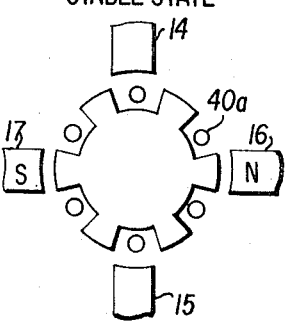
FIG. 6
| SEQUENCE No. | STATOR WINDING | | ROTOR WINDING | | STATE OF THE ROTOR |
|---|---|---|---|---|---|
| | $X_1 \to X_2$ | $Y_1 \to Y_2$ | $x_1 \to x_2$ | $y_1 \to y_2$ | |
| 1 | + | 0 | 0 | 0 | STABLE |
| 2 | 0 | + | 0 | + | STARTING |
| 3 | 0 | + | 0 | + | RUNNING |
| 4 | 0 | + | 0 | − | DAMPING |
| 5 | 0 | + | 0 | 0 | STABLE |
| 6 | + | 0 | + | 0 | STARTING |
| 7 | + | 0 | + | 0 | RUNNING |
| 8 | + | 0 | − | 0 | DAMPING |
| 1 | + | 0 | 0 | 0 | STABLE |

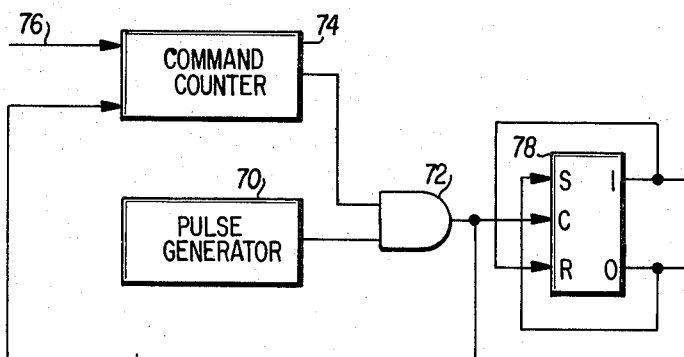
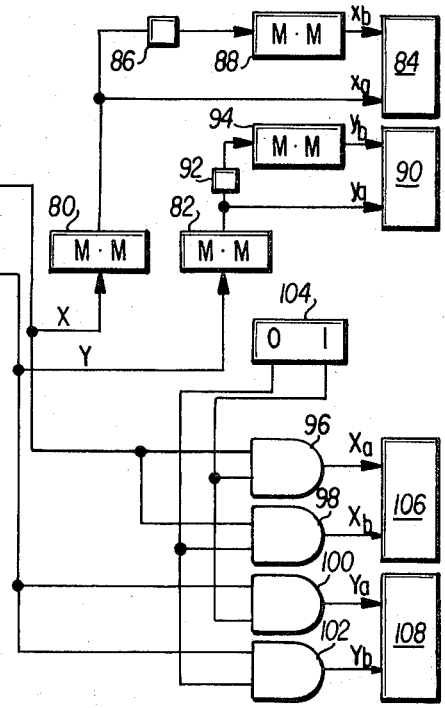
FIG. 7a
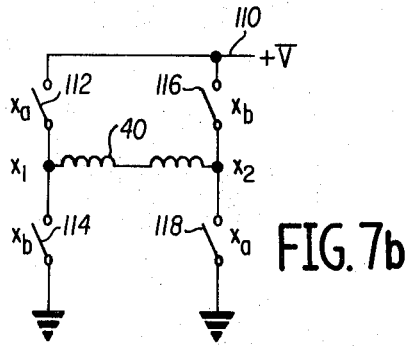
FIG. 7b
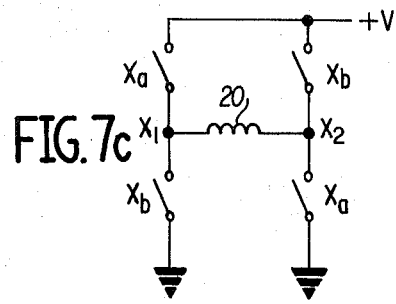
FIG. 7c
FIG. 8
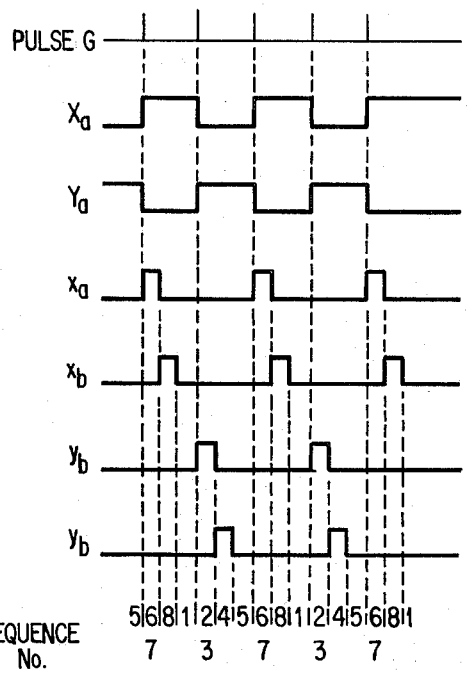
FIG. 9
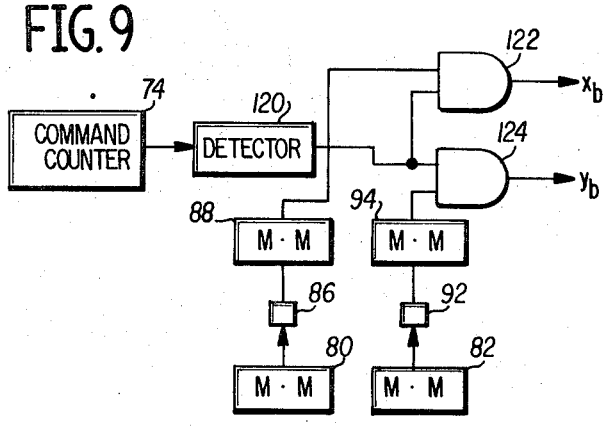

3,798,526

HIGH SPEED STEPPING MOTOR WITH MECHANICAL COMMUTATOR

BACKGROUND OF THE INVENTION

1. Field Of The Invention:

This invention generally relates to a high speed stepping motor, and more particularly to a high speed stepping motor having certain characteristics of a D.C. motor.

2. Description Of The Prior Art:

Generally, a conventional stepping motor includes a rotor made of a magnetic material which has salient teeth on the peripheral surface thereof and a stator which also has salient teeth. The stator is also made of a magnetic material and is positioned around the rotor with a small gap therebetween. A stator winding is wound on the stator, and input pulses are supplied thereto for causing a current to flow through a rotor winding to magnetize the teeth of the stator in a predetermined sequence. The magnetomotive force induced on the teeth will generate a torque and thereby move the rotor such that the teeth of the rotor are attracted towards the teeth of the stator.

In the conventional stepping motor as described above, while somewhat satisfactory, one problem is that the ability of a high speed response is due only to the torque-moment of inertia rate, and accordingly, the ability of a high speed response is reduced as the generated torque decreases. Moreover, in the conventional stepping motor, the torque is determined by the rate of change of the potential of the magnetic field induced by the stator with respect to a rotating angle, and since saturation of the magnetic field in the magnetic material and accuracy of the construction thereof are limited, the extent of the generated torque is also limited. In addition, the inertia efficiency can not be reduced below a certain value, since it is related to the bending intensity of the rotor, the Young's modulus of the material and the air gap between the stator and the rotor.

SUMMARY OF THE INVENTION

Accordingly, it is an object of the present invention to provide a new and improved unique high speed stepping motor.

It is another object of the present invention to provide a new and improved unique high speed stepping motor having certain characteristics of a D.C. motor.

It is one other object of the present invention to provide a new and improved unique high speed stepping motor in which a high starting torque and a high damping torque can be generated.

It is yet one further object of the present invention to provide a new and improved unique high speed stepping motor in which the ability to respond to high frequency operation is high.

Briefly, in accordance with the present invention, these and other objects are obtained by providing a stator having a bore and a plurality of salient poles on which stator windings are wound. A rotor is also provided having a plurality of axial teeth and slots alternatively positioned on a peripheral surface thereof. A plurality of rotor windings are respectively mounted in the slots of the rotor. A commutator is mounted on a shaft of the rotor and has segments which are respectively connected to the rotor windings. Brushes are provided for making contact with the commutator segments in order to supply electric energy to the rotor windings. Means are provided to change the direction of energization of the stator windings to thereby change the direction of the magnetic field and for changing the direction of energization of the rotor windings in synchronization therewith.

BRIEF DESCRIPTION OF THE DRAWINGS

A more complete appreciation of the invention will be readily obtained as the same becomes better understood by reference to the following detailed description when considered in connection with the accompanying drawings, wherein:

FIGS. 5a–5e illustrate the various relationships between the stator and the rotor of the high speed stepping motor of the present invention as it rotates;

FIG. 6 is a diagram showing the sequence of energization of the stator and rotor windings of the high speed stepping motor according to this invention;

FIGS. 7a, 7b and 7c are circuit diagrams of one embodiment for controlling the high speed stepping motor according to the present invention;

FIG. 8 is a time chart for explaining the operation of the circuit of FIGS. 7a, 7b and 7c; and, FIG. 9 is a circuit diagram of another embodiment for controlling the high speed stepping motor according to the present invention.

DETAILED DESCRIPTION OF THE PREFERRED EMBODIMENTS

Figure 1:
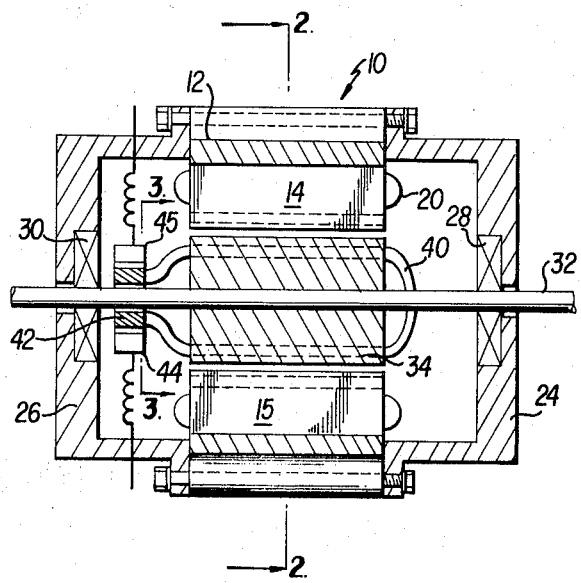
FIG. 1 is a cross-sectional view of a high speed stepping motor according to the present invention.
Figure 3:
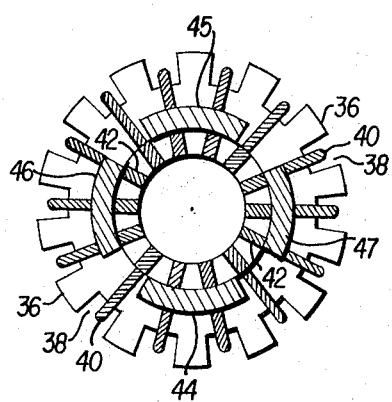
FIG. 3 is a cross-section taken along the line B—B of FIG. 1.
Figure 2:
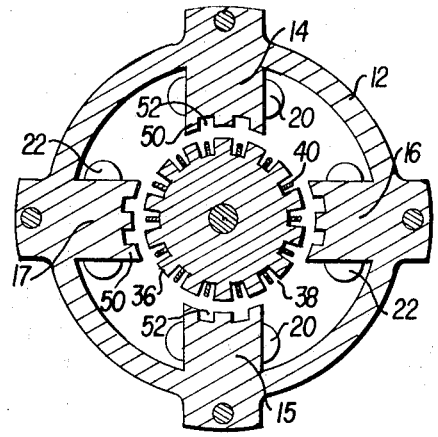
FIG. 2 is a cross-section taken along the line A—A of FIG. 1.
Figure 4:
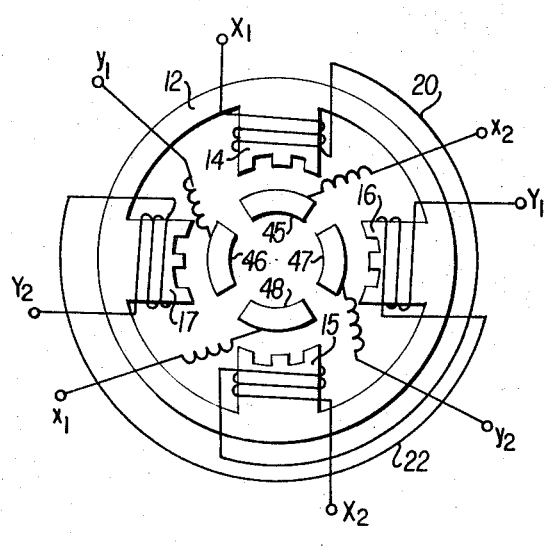
FIG. 4 illustrates the connections of the stator windings of the high speed stepping motor of the present invention.

Referring now to the Drawings, wherein like reference numerals designate identical, or corresponding parts throughout the several views, and more particularly to FIGS. 1 to 4 thereof, wherein a high speed stepping motor in accordance with the present invention is shown as including a stator 10, having a bore or cylindrical yoke 12 and four salient magnetic poles 14 to 17 which are mounted on the inside of the yoke 12 and located with a mechanical angle of 90° from each other. A stator winding 20 having two terminals $X_1$ and $X_2$ is wound on the magnetic poles 14 and 15 as shown in FIG. 4, such that if the current flows from the terminal $X_1$ to the terminal $X_2$, the pole 14 will be magnetized with a north (N) polarity, while the pole 15 will be magnetized with a south (S) polarity. A magnetic flux is thereby provided between the poles 14 and 15 and across a rotor 34. Another stator winding 22 having two terminals $Y_1$ and $Y_2$ is wound on the magnetic poles 16 and 17 as shown in FIG. 4, such that if the current flows from the terminal $Y_1$ to the terminal $Y_2$, the pole 16 will be magnetized with a north (N) polarity, while pole 17 will be magnetized with a south (S) polarity. A magnetic flux is thereby provided between the poles 16 and 17 and across the rotor 34.

A pair of brackets 24 and 26 are provided and connected by bolts to both sides of the stator 10 and serve to cover the same. At the center portions of the brackets 24 and 26, respective bearings 28 and 30 are provided to rotatably sustain a shaft 32 of the rotor 34 such that the rotor 34 will rotate along the axis of the stator 10 with an air gap between the stator 10 and the rotor 34. The rotor 34 has a plurality of teeth 36 and slots 38 which alternatively have the same pitch on a peripheral surface thereof. The number of the teeth 36 or slots 38 are defined by the equation, $2(2n + 1)$, wherein $n$ is an arbitrary integer, and is shown by example in the embodiment of FIGS. 2 and 3 as being equal to 3. Rotor windings 40 are mounted in the slots 38 of the rotor 34. One end of the rotor windings 40 are connected to respective commutator segments 42 which are mounted on the shaft 32. The other ends of the rotor windings 40 are respectively connected to each other at opposite rotor windings. Four brushes 44 to 47 having respective input terminals $x_1$, $x_2$, $y_1$ and $y_2$ are provided and electrically contact the commutator segments 42 in order to supply current therethrough to the rotor windings 40. The brushes 44 to 47 are also located with a mechanical angle of 90° from each other.

On the magnetic poles 14 to 17, teeth 50 and slots 52 are also provided and the pitch thereof is the same as that of the teeth 36 and the slots 38 of the rotor 34.

When the stepping motor, as described above, is in a stable state, the teeth 50 of the two facing poles 14 and 15 are positioned to face the teeth 36 of the rotor 34, while the teeth of the other poles 16 and 17 are positioned to face the slots 38 of the rotor 34. In this manner, only the poles 14 and 15 are magnetized such that the teeth 50 thereof are attracted to the teeth 36 and thus a stable or non-rotating state is maintained. In this state, the stator winding 22 and the rotor winding 40 are not energized. Now, when an input pulse is introduced to the stator winding 22, the poles 14 and 15 will be demagnetized, while the poles 16 and 17 and selected rotor windings 40 will be energized such that the teeth of the poles 16 and 17 will be attracted to the teeth 36 of the rotor 34. As a result thereof, the rotor 34 will rotate by one step or one pitch of the teeth 36 or the slots 38 in a direction determined by the polarity of the applied pulse. The rotor 34 will stop in a position such that the teeth 50 of the poles 16 and 17 and the teeth 36 of the rotor 34 will face each other.

Referring now to FIGS. 5 and 6, the operation of the above embodiment will be explained hereinafter. In FIG. 5, in order to simplify the illustration, the number of teeth or slots of the rotor 34 are shown to be 6, the value of $n$ is selected to be equal to 1, and the magnetic poles 14 to 17 have only one tooth. FIG. 6 is a diagram which shows the sequence of energization of each of the windings. In FIG. 6, the + symbol means a flow of current from the terminal $X_1$ to the terminal $X_2$, the terminal $Y_1$ to the terminal $Y_2$, the terminal $x_1$ to the terminal $x_2$ and the terminal $y_1$ to the terminal $y_2$ while the symbol − means a flow of current from the terminal $Y_2$ to the terminal $Y_1$, the terminal $X_2$ to the terminal $X_1$, the terminal $y_2$ to the terminal $y_1$ and the terminal $x_2$ to the terminal $x_1$. The symbol 0 means that no current flows through the particular winding.

The state of the rotor 34 corresponding to the sequence No. 1 is shown in FIG. 5a. In this sequence, by flowing a current from the terminal $X_1$ to the terminal $X_2$, only the stator winding 20 is energized such that the pole 14 is magnetized with an N polarity, while the pole 15 is magnetized with an S polarity. The teeth 36a and 36d are respectively positioned to face the poles 14 and 15, while the slots 38b and 38e are positioned to face the poles 16 and 17. Under these conditions, the rotor windings are not energized since no current is supplied to the brushes. Accordingly, no torque is produced and the rotor 34 will be maintained in a stable state by the magnetic attraction of the teeth 36a and 36d and the poles 14 and 15 with each other. In the next sequence, as shown in FIG. 5b, the stator winding 22 is energized, and the poles 16 and 17 are magnetized with a respective N and S polarity. A current is also supplied from the terminal $y_1$ to the terminal $y_2$ through the brushes 46 and 47 and the commutator segments 42 to the rotor windings 40. Current will thus flow from back to front through the rotor windings 40a to 40c as shown by the symbol "." in FIG. 5b and then from front to back through the rotor windings 40d to 40f as shown by the symbol + in FIG. 5b. As is generally well known in the art, by the Fleming's left hand law, a torque will then be generated and the rotor 34 will start to rotate in a direction as shown by the arrow in FIG. 5b. In sequence No. 3, which corresponds to FIG. 5c, a current is also supplied from the terminal $Y_1$ to the terminal $Y_2$ through the stator winding 22, and from the terminal $y_1$ to the terminal $y_2$ through the rotor windings 40. The rotor 34 will thereby continue to rotate by the torque in the direction as shown by the arrow.

In sequence No. 4, a current is supplied from the terminal $y_2$ to the terminal $y_1$ such that current will flow from front to back through the rotor windings 40a and 40b as shown in FIG. 5d, and from back to front through the rotor windings 40d and 40e. It is easily understood that the torque 50 generated will be of an inverse direction to that of the rotating direction so that the rotation of the rotor 34 is damped. In sequence No. 5, as shown in FIG. 5e, none of the rotor windings are energized and as a result thereof no torque is generated and the rotor 34 will stop with the teeth 36b and 36e being positioned to face the poles 16 and 17, and with the slots 38f and 38c being positioned to face the poles 14 and 15. The rotation of one step of the motor is now completed. If at any time a pulse is not successively introduced, the rotor 34 will stop by the magnetic attraction of the teeth 36b and 36e with the poles 16 and 17.

The operation of sequence Nos. 6 to 8 of FIG. 6 are the same as that of sequence Nos. 2 to 4, and accordingly the rotor 34 will rotate to a position such that the teeth 36f and 36c are positioned to face the poles 14 and 15 and thereby complete another step.

FIGS. 7a, b and c show circuit diagrams of a control circuit for operating the high speed stepping motor according to this invention. Referring now to FIG. 7a, the control circuit is shown as including a variable frequency pulse generator 70 which supplies input pulses to an AND gate 72. It is well known that an AND gate is a gate which has a high output only when all of its inputs are high. If any of the inputs of the AND gate are low, then the output of the gate will remain low. The other input of the AND gate 72 is supplied from an up-down command counter 74. The command counter 74 will count up command pulses 76 and will produce a high output, except when the content thereof becomes 0. The output of the command counter 74 will become low when the content thereof becomes 0. The command counter 74 will count down the output pulses of the AND gate 72. The output pulses of the AND gate 72 are also fed to a "clock" terminal of a flip-flop 78. The flip-flop 78 is operated such that when the clock input is high in the presence of a high first input, a first output thereof will become high, while a second output will become low. On the other hand, the second output of the flip-flop 78 will become high when the clock input is high in the presence of a high second input, while the first output thereof will become low. It should be understood that the first input of the flip-flop 78 is the second output, and the second input is the first output thereof. Thus, it should be apparent that upon the receiving of each clock input pulse (high output of the AND gate 72), the flip-flop 78 will its state, or, in other words, alternatively produce a high output from the first and second output terminals thereof.

The first and second outputs of the flip-flop 78 are respectively applied to mono-multivibrators 80 and 82. Each of the mono-multivibrators 80 and 82 will produce a high output therefrom which has a constant pulse width when the inputs thereto change from a low to a high value. The output of the mono-multivibrator 80, which is hereinafter designated by the letter $x_a$, is directly fed to an x-switching circuit 84, and is also fed to the x-switching circuit 84 through a differential circuit 86 and a mono-multivibrator 88. The output of the mono-multivibrator 82, which is hereinafter designated by the letter $y_a$, is directly fed to a y-switching circuit 90, and is also fed to the y-switching circuit 90 through a differential circuit 92 and a mono-multivibrator 94. The differential circuits 86 and 92 will produce a high output therefrom when the input thereto changes from a high to a low value. The mono-multivibrators 88 and 94 will operate in the same manner as the mono-multivibrators 80 and 82. The outputs of the mono-multivibrators 88 and 94 are hereinafter respectively designated by the letters $x_b$ and $y_b$.

The first output of the flip-flop 78 is also introduced to AND gates 96 and 98, and the second output of the flip-flop 78 is introduced to AND gates 100 and 102. The other input to the AND gates 96 and 100 is supplied from the first output of a flip-flop 104, and the other input of the AND gates 98 and 102 is supplied from the second output of the flip-flop 104. The flip-flop 104 will produce a high second output when the command pulses 76 have a first polarity such that the rotor 34 is rotated in a clockwise direction, and will produce a high second output when the command pulses 76 have a second polarity such that the rotor 34 is rotated in an anti-clockwise direction. The outputs of the AND gates 96 and 98 are respectively hereinafter designated by the letters $X_a$ and $X_b$, and are fed to an X-switching circuit 106. The outputs of the AND gates 100 and 102 are respectively hereinafter designated by the letters $Y_a$ and $Y_b$, and are fed to a Y-switching circuit 108.

The x-switching circuit 84 of FIG. 7a is shown in FIG. 7b. In FIG. 7b, it is seen that the terminal $x_1$ is connected to a power supply 110 through a switch 112, and is also connected to ground through a switch 114. The terminal $x_2$ is connected to the power supply 110 through a switch 116, and is also connected to ground through a switch 118. The rotor windings 40 are connected between the terminals $x_1$ and $x_2$ as described before. The switches 112 and 118 are closed only when the input $x_a$ is high to thereby cause a current to flow from the terminal $x_1$ to the terminal $x_2$. On the other hand, the switches 114 and 116 are closed only when the input $x_b$ is high to thereby cause a current to flow from the terminal $x_2$ to the terminal $x_1$. The y-switching circuit 90 is similar to that of the x-switching circuit 84 and accordingly is not shown. It can be easily understood, however, that when the input $y_a$ is high, a current will flow from the terminal $y_1$ to the terminal $y_2$, and that when $y_b$ is high, a current will flow from the terminal $y_2$ to the terminal $y_1$.

The X-switching circuit 106 of FIG. 7a is shown in FIG. 7c with the understanding that here again the Y-switching circuit 108 is similar thereto and accordingly is not shown. Moreover, the X-switching circuit 106 is similar to that of the x-switching circuit 84. Thus, when $X_a$ is high, a current will flow from the terminal $X_1$ to the terminal $X_2$ through the stator winding 20, and so on.

Referring now to FIG. 8, the operation of the control circuit of FIG. 7a will be explained. Initially, the case wherein the command pulse 74 has the first polarity is explained. Under such conditions, the flip-flop 104 will have a high first output and a low second output. In accordance therewith, the AND gates 96 and 100 will open. On the other hand, if it is assumed that the second output of the flip-flop 78 is high, then the AND gate 100 will produce a high output such that a current will flow from the terminal $Y_1$ to the terminal $Y_2$ through the stator winding 22. As before mentioned, this state is designated as sequence No. 5, and the rotor 34 is thereby in a stable state.

A certain number of command pulses 74, such, for example, as 5, are then introduced to the command counter 74. As the content of the command counter 74 becomes equal to 5, it will produce a high output, so that the AND gate 72 is opened. As a result thereof, pulses from the pulse generator 70 are fed to the flip-flop 78. The command counter 74 will count down the output pulses of the AND gate 72 from the content thereof so that after receiving 5 pulses, the content of the command counter 74 will be zero. At such time, the output of the command counter 74 will become low and no further pulses will be supplied from the pulse generator 70 to the flip-flop 78, since the AND gate 72 will be closed. It should now be apparent that the number of times that the flip-flop 78 changes its state is entirely determined by the content of the command counter 74, or, in other words, the number of applied input pulses 76.

Each time an output pulse occurs from the AND gate 72, the flip-flop 78 will change its state such that $X_a$ and $Y_a$ will alternatively change from a low to a high value. Upon receipt of the first pulse from the pulse generator 70, the first output of the flip-flop 78, or $X_a$ will change its state from a low to a high value such as to cause a current to flow from the terminal $X_1$ to the terminal $X_2$ through the stator winding 20. The mono-multivibrator 80 will then produce a high output therefrom of a certain width, and as a result thereof, $x_a$ will become high during the certain pulse width, and a current will flow from the terminal $x_1$ to the terminal $x_2$. This state is designated as sequence Nos. 6 and 7, wherein the rotor is respectively in the starting and running states.

When $x_a$ changes states from a high to a low value, as described above, and $x_b$ will become high during the time that is determined by the pulse width of the mono-multivibrator 88, a current will then flow through the rotor windings 40 from the terminal $x_2$ to the terminal $x_1$ to result in the previously explained sequence No. 8. After $x_b$ changes to a low value, the rotor 34 will be in a stable state, as explained in sequence No. 1. The rotor 34 will rotate by one step as a result of a change in the state of the flip-flop 78.

When the flip-flop 78 receives the next input clock pulse, the operation during $Y_a$ will change from a low to a high value to result in an operation similar to that described with regard to $X_a$.

It can be easily understood that if the flip-flop 104 produces a high second output that the AND gates 98 and 102 will be opened such that a current will flow from the terminal $X_2$ to the terminal $X_1$ through the stator winding 20, and from the terminal $Y_2$ to the terminal $Y_1$ through the stator winding 22. In accordance therewith, the rotor 34 will rotate in the anti-clockwise direction. Obviously, the direction of rotation can be readily changed by changing the direction of the rotor current. Moreover, it should be apparent that the speed of rotation can be varied by varying the frequency of the pulse generator 70. It can also be easily understood that instead of sequentially changing the magnetizing of the poles in the sequence such as the pole 14 → the pole 16 → the pole 14 of N polarity to cause rotation in a clockwise direction that the same rotation can be reailized by sequentially changing the magnetizing of the poles according to a sequence such as the pole 14 → the pole 16 → the pole 15 → the pole 17 of N polarity.

If it is desired to continuously rotate the motor with a high speed, it is preferable to operate the same without a damping state. For example, in the case where 500 command pulses 76 are supplied, it is preferable to rotate the motor without a damping state during 499 steps, and during the last step a damping torque can be applied to allow the rotation to be smoothly stopped. FIG. 9 is a circuit diagram of a control circuit which operates according to the above just-described principle. In FIG. 9, the parts which are the same as those in FIG. 7a are not shown. In FIG. 9, it is seen that a 1-detector 120 is provided to produce a high output when the content of the command counter 74 becomes 1. The output of the 1-detector 120 is supplied to AND gates 122 and 124. The other inputs of the AND gates 122 and 124 are supplied from the respective mono-multivibrators 88 and 94. The output of the AND gates 122 or 124, or $x_b$ or $y_b$ become high only when the content of the command counter 74 becomes 1 in the presence of the high output of the mono-multivibrator 88 or 94. Accordingly, only during the last step of the motor will a damping torque be applied to the rotor 34.

It should now be apparent according to the present invention, as described above, that the rotor windings 40 are mounted in the slots 38 of the rotor 34, and a current is supplied to the rotor windings 40 through brushes 44 to 47 to commutator segments 42 as is generally done in a D.C. motor. Accordingly, by changing the direction of energization of the rotor windings 40 in synchronization with the changing of the direction of energization of the stator windings, the rotor 34 can rotate with a high speed, with a high starting torque and with a high damping torque. Moreover, the above-described invention can clearly be applied to a three-phase stepping motor, poly-phase stepping motors, or the like.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A high speed stepping motor comprising:
   a stator having a bore and a plurality of salient poles on which stator windings are wound;
   a rotor having a plurality of axial teeth and slots positioned alternatively on a peripheral surface thereof;
   a plurality of rotor windings respectively mounted in said slots of said rotor;
   a commutator mounted on a shaft of said rotor and having segments respectively connected to said rotor windings;
   brushes for making contact with said commutator segments to enable electric energy to be supplied to said rotor windings; and,
   means for changing the direction of energization of said stator windings to thereby change the direction of the magnetic field resulting therefrom and for synchronously changing the direction of energization of said rotor windings, so that the said rotor may be stepwise rotated,
   wherein said rotor and stator windings are separately energized, and;
   wherein said means for synchronously changing the direction of energization of said stator windings and said rotor windings includes a command counter for generating pulses for a given count; a detector for detecting the last count of said predetermined count; and gating means responsive to a last count detection by said detector for causing said synchronous change in the direction of energization to occur whereby said stepping motor can be continuously run at a high speed up until said last count is detected.

2. A high speed stepping motor comprising:
   a stator having a bore and a plurality of salient poles on which stator windings are wound;
   a rotor having a plurality of axial teeth and slots positioned alternatively on a peripheral surface thereof;
   a plurality of rotor windings respectively mounted in said slots of said rotor;
   a commutator mounted on a shaft of said rotor and having segments respectively connected to said rotor windings;
   brushes for making contact with said commutator segments to enable electric energy to be supplied to said rotor windings; and,
   means for changing the direction of energization of said stator windings to thereby change the direction of the magnetic field resulting therefrom and for synchronously changing the direction of energization of said rotor windings, wherein said means for synchronously changing the direction of energization of said stator windings and said rotor windings includes a command counter for generating pulses of a first polarity for a given count and for generating pulses of a second polarity after said given count is reached; and, switching means for generating a first output when said command counter generates said first polarity pulses to provide a torque for rotating said rotor in a first direction and for generating a second output when said command counter generates said second polarity pulses to provide a damping torque to rotate said rotor in a second and reverse direction.

3. A high speed stepping motor as in claim 2, wherein said rotor windings connected to said commutator segments are connected only to one end of said rotor windings, the other ends of said rotor windings being oppositely connected to each other.

4. A high speed stepping motor as in claim 2, wherein said switching means is a flip-flop.

5. A high speed stepping motor as in claim 2, wherein said means for synchronously changing the direction of energization of said stator windings and said rotor windings further includes:
   a variable frequency pulse generator;
   an AND gate having an output from said pulse generator and from said command counter as inputs thereto;
   a flip-flop having a clock input and a first and a second output;
   an output of said AND gate being applied to the clock input of said flip-flop and to an input of said command counter;
   a first mono-multivibrator and a second mono-multivibrator;
   gating means, said first and said second outputs of said flip-flop being respectively connected to said first and said second mono-multivibrators and to said gating means;
   a first and a second switching circuit to which an output of said first and said second mono-multivibrators is each directly and indirectly connected; and,
   a third and a fourth switching circuit to which outputs of said gating means are connected.

6. A high speed stepping motor as in claim 5, wherein said gating means includes a first, a second, a third, and a fourth AND gate.

* * * * *